Figure 1:
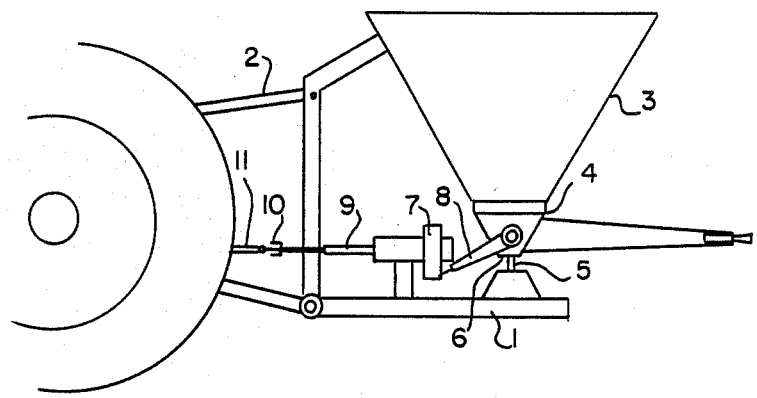

United States Patent [19]
Winkel et al.

[11] Patent Number: 4,793,558
[45] Date of Patent: Dec. 27, 1988

[54] DEVICE FOR DISSEMINATION OF A SPREADABLE MATERIAL

[75] Inventors: Jan Winkel, Sassenheim; Gerrit J. Lamfers, Nieuw-Vennep, both of Netherlands

[73] Assignee: Multinoru B.V., Nieuw-Vennep, Netherlands

[21] Appl. No.: 15,682

[22] Filed: Feb. 17, 1987

[30] Foreign Application Priority Data

Feb. 10, 1986 [NL] Netherlands .................. 8600420

[51] Int. Cl.$^4$ .................................. A01C 15/00
[52] U.S. Cl. .................. 239/659; 239/689; 222/564
[58] Field of Search .......... 239/659, 590.5, 601, 239/461, 590, 553, 553.5, 655, 688, 689, 502; 222/564; 406/191, 92; 138/37, 177, 178, DIG. 11; 141/333, 391

[56] References Cited

U.S. PATENT DOCUMENTS

| 1,963,056 | 6/1934 | Wilcox | 138/177 |
| 2,432,641 | 12/1947 | Wilson | 138/177 |
| 3,942,726 | 3/1976 | | 239/659 |
| 4,114,814 | 9/1978 | Oosterling et al. | 239/689 |

FOREIGN PATENT DOCUMENTS

| 3045140 | 6/1982 | Fed. Rep. of Germany | 406/191 |
| 1438683 | 6/1976 | United Kingdom | 239/659 |

*Primary Examiner*—Andres Kashnikow
*Assistant Examiner*—Karen B. Merritt
*Attorney, Agent, or Firm*—John P. Snyder

[57] ABSTRACT

A device for disseminating spreadable material, such as fertilizer pellets or powders, consisting substantially of a frame (1) that is pulled or carried, a storage holder (3) for that material, a dosage mechanism (4) fitted beneath the holder (3) and a reciprocally driven spreading pipe (12) connected to the mechanism (4) wherein on either side of the vertical longitudinal plane the spreader pipe (12) is provided with a surface for instance formed by a longitudinal rib (22) guiding the spreadable material, said surface enclosing an angle α with the vertical and extending at least over a part of or over the whole length of the pipe (12) so obtaining an even spread of the material and in particular a symmetrical spreading pattern.

14 Claims, 2 Drawing Sheets

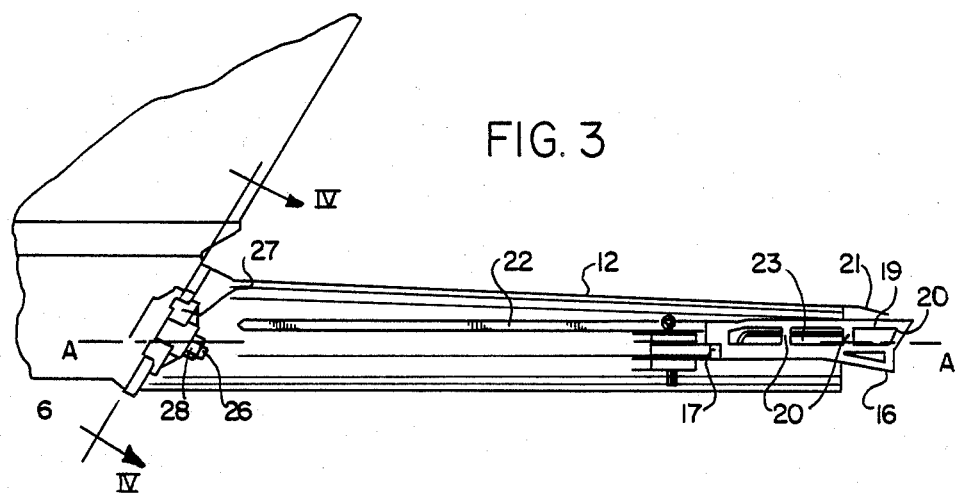
FIG. 3
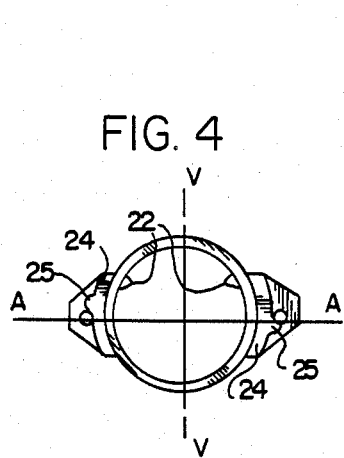
FIG. 4
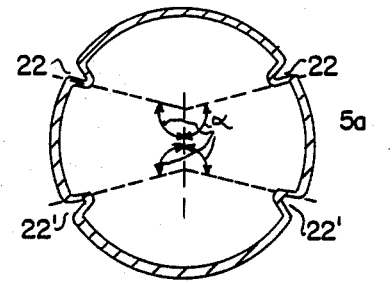
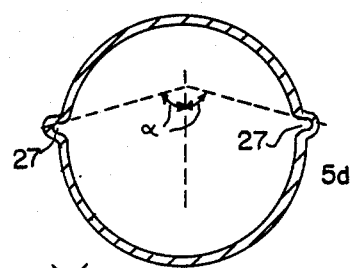
FIG. 5
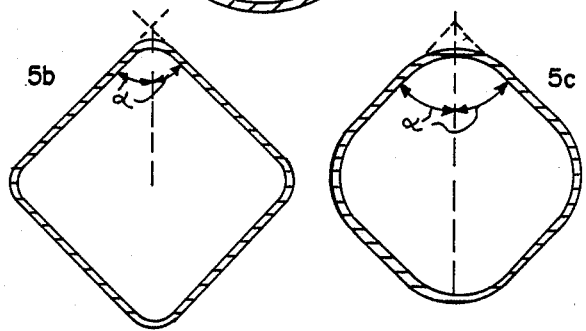

DEVICE FOR DISSEMINATION OF A SPREADABLE MATERIAL

The invention relates to a device for disseminating spreadable material, such as fertilizer pellets or powders, consisting substantially of a frame that is pulled or carried, a storage holder for that material, a dosage mechanism fitted beneath the holder and a reciprocally driven spreading pipe connected to the mechanism.

Such a device, generally known as an oscillating spout-spreader, can disseminate the material over the field over a determined width behind the direction of movement. A particular pattern of spread is hereby followed, that is, when the direction of movement is reversed an adjoining strip of ground can be sprinkled, whereby the strips overlap so that an even distribution of the material over the field is obtained. With the current tendency to achieve increasingly greater spreading widths, the material becomes increasingly sensitive to weather conditions such as humidity and wind, which has an adverse influence on the pattern of spread. It has also been found that with the known devices of this type the spreading pipe cannot be attached accurately enough so that as a result asymmetrical patterns of spread occur. An irregular pattern of spread occurs particularly in suspended devices as a result of the unavoidable oscillating reaction movements of the device itself.

The invention has for its object to improve a device of the type described in the preamble such that the above mentioned drawbacks are obviated.

The device according to the invention is distinguished in that on either side of the vertical longitudinal plane the spreader pipe is provided with a surface guiding the spreadable material which encloses an angle α with the vertical and which extends at least over a part of or over the whole length of the pipe.

As a result of the use of the longitudinal guide face on either side of the vertical longitudinal plane, occurrence of a screw thread-like movement of the material (e.g., along a helical path within and relative to the pipe), which increases speed in the spreader pipe, is prevented. This can occur as a result of the uneven feed into the spreader pipe, and/or the oscillating reaction movement referred to, whereby the material also leaves the discharge opening of the spreader pipe unevenly. The screw thread or helical path of movement of the particulate material within and relative to the spreader pipe is caused by the velocity imparted to the material by the rapid whipping motion of the pipe and the repeated striking of the interior of the pipe against such traveling material before it reaches the discharge end of the pipe. In accord with this invention, such helical motion is converted to a generally zig-zag motion which confines the travel of material along the length of the pipe within a zone which is generally centrally located along the length of the pipe and is of vertical width less than the cross-sectional area of the pipe.

In one embodiment the guide surface is formed by the flank of at least one protruding longitudinal rib on either side of the vertical longitudinal plane.

Trial experiences have established that the pair of longitudinal ribs arranged symmetrically relative to the vertical plane should lie preferably in a plane higher than the horizontal central plane of the spreader pipe.

In another embodiment the guide surface is formed by a flank of a longitudinal groove on either side of the vertical central longitudinal plane of the spreader pipe.

If the spreader pipe is provided with flow regulating means in the form of a bracket around its discharge opening, this bracket substantially lying beneath the horizontal central longitudinal plane, then the invention further proposes fitting of a second bracket situated higher than the central longitudinal plane of the spreader pipe and preferably in the said plane through the longitudinal ribs on the inside of the spreader pipe. In order to ensure correct fitting of the spreader pipe to an oscillating driven carrier under the dosage mechanism, the spreader pipe is preferably provided with a connecting flange formed with two radially protruding projections which are brought into contact with the shank of attachment bolts or the like on the carrier. The spreader pipe is hereby centered relative to the carrier in a simple manner, which guarantees an even feeding of the material into the spreader pipe.

The invention is further elucidated in the figure description following below of an embodiment of the device.

Figure 2:
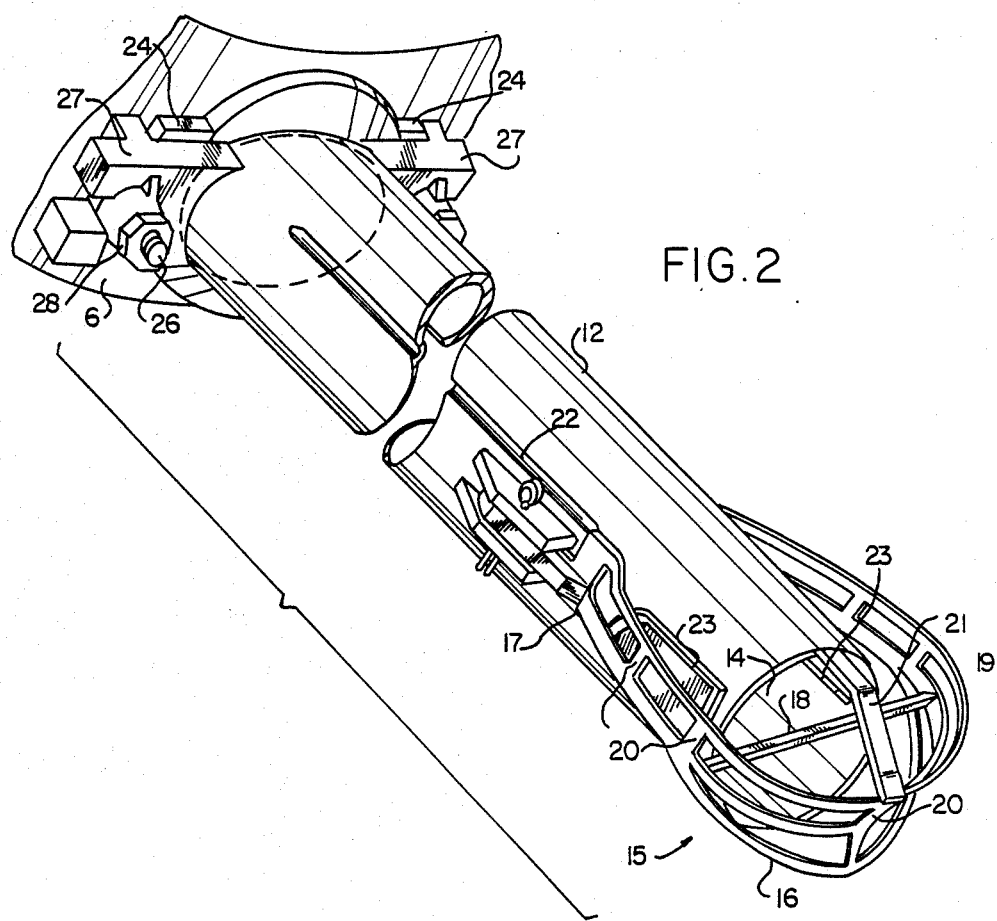

In the drawing:

FIG. 1 shows a side view of a carried device having a spreader pipe according to the invention, FIG. 2 shows a perspective top view of the spreader pipe from FIG. 1, FIG. 3 is an upright side view of the spreader pipe from FIG. 2, FIG. 4 is a view along the lie IV—IV in FIG. 3.

FIGS. 5a, b, c, d show a cross section of the spreader pipe in accordance with different embodiments.

Indicated with the numeral 1 is the frame of the device, which can for example be suspended on the three-point suspension 2 of an agricultural tractor (not shown), so that the device can be moved forward over the field.

Arranged on frame 1 in a known manner is a storage holder 3 under which is placed a dosage mechanism 4 for supplying in doses the material for spreading stored in storage holder 3. Mounted for rotation on the bottom of dosage mechanism 4 is a carrier 6 which can pivot on a vertical shaft 5, which shaft 5 is supported by frame 1. The carrier 6 can move reciprocally by means of a fly-wheel mechanism 7 in which a drive fork 8 is mounted eccentrically, this fork being connected for pivoting with carrier 6. The fly-wheel 7 is set into rotation by the drive shaft 9 which is coupled via a universal coupling 10 with the power takeoff 11 of the agricultural tractor.

Carrier 6 is connected on the side facing away from the drive mechanism 7 to a spreader pipe 12. Spreader pipe 12 is further explained in FIGS. 2, 3 and 4.

The spreader pipe 12 is normally moulded from a plastic such that starting from the in-feed opening 13 it is given a convergent cross section. Arranged around the discharge opening 14 of the spreader pipe is a bracket-shaped member 15 which influences the material flow, which member consists of a lower bracket 16, the ends 17 of which are attached to the side of spreader pipe 12 in a random and appropriate manner. Placed between this lower bracket close to the end of discharge opening 14 is a cross strip 18 the upper face of which is directed inclined upward.

In accordance with a feature of the invention, added to the lower bracket 16 is an upper bracket 19 which is connected to lower bracket 16 by means of spacing strips 20.

It will be apparent from FIG. 3 that the lower bracket 16 is substantially located below the horizontal central longitudinal plane A—A, which is here the greatest width of the spreader pipe, while the second bracket 19 extends above it.

In addition the second bracket 19 is connected at the top with the upper part of spreader pipe 12 by means of a connecting strip 21. The advantage hereby achieved is to ensure a three-point attachment of the upper bracket 19 to spreader pipe 12, which guarantees an accurate positioning of the spreading brackets in relation to discharge opening 14 of the spreader pipe, so that the required pattern of spread is achieved in all positions during the reciprocating movement.

It is noted that the second bracket 19 is of larger size than the first bracket 16, thereby ensuring a favourable effect on the material coming from the cross strip 18 and achieving a more favourable flow picture of the material for spreading.

According to the main characteristic of the invention the inside of spreader pipe 12 is formed with longitudinal ribs 22 which are located symmetrically relative to the vertical central longitudinal plane V—V, see FIG. 4, and which are in addition located in a plane situated higher than the horizontal central longitudinal plane A—A. The flanks of these longitudinal ribs 22 ensure guiding of the material for spreading through spreader pipe 12 because they enclose an angle $\alpha$ with the vertical and moreover guide the material such that it comes into contact with the flow regulating member formed by the two brackets 16, 19.

It is noted for the sake of comprehensiveness that the upright side walls of the spreader pipe 12 close to the discharge opening 14 are formed with orifices 23 in order to already allow a part of the material for spreading to glance off the side of bracket 16.

On the in-feed side the spreader pipe 12 is formed with an attachment flange 24 which is formed on the outside with a stop boss 25 which is brought into contact with the attachment bolts 26 on the carrier 6. The attachment bolts 26 permanently bear a clamping plate 27 which is dimensioned such that when the nut 28 fitted on bolt 26 is tightened it applies a clamping action to the front face of flange 24, tensioning it firmly against the carrier 6.

In view of the fact that the flange 24 is arranged on both sides of the spreader pipe the latter can be fitted by being rotated through an angle of 90° up to the point the bosses 25 strike up against the bolt shank 26. After tightening of nut 28 the spreader pipe is attached. Disconnection of the pipe is carried out by reversing this sequence.

The invention is not limited to the embodiment described above. In this respect FIG. 5 shows various cross sectional forms which fall within the frame of reference of the concept of the invention. FIG. 5*a* shows four longitudinal ribs 22, 22' on the inside of the spreader pipe. FIGS. 5*b*, *c* show a more or less rectangular cross section whereby the guide surface is formed by at least one straight part of the pipe wall. FIG. 5*d* shows a groove 27' the flank of which is a guide surface. The flank surfaces do not have to run absolutely straight but can be formed slightly convex or concave.

We claim:

1. A device for spreading particulate material such as fertilizer onto ground surface, which comprises the combination of a frame adapted to be attached to a powered vehicle and a hopper carried by the frame and having a bottom opening, a dosage mechanism disposed below the bottom opening of the hopper for receiving particulate material therefrom and including a horizontally projecting spreader pipe having a longitudinal axis, an infeed end communicating with the hopper bottom opening, an inner surface for guiding the particulate material along the length of the spreader pipe and a free end portion defining a discharge end, means for rapidly oscillating the dosage mechanism about a generally vertical axis so that the spreader pipe whips back and forth to travel and guide particulate material from the infeed end to the discharge end under action of centrifugal force and to broadcast particulate material through the discharge end thereof, and the inner surface of the spreader pipe including guide surface means on either side of a vertical plane containing the longitudinal axis of the spreader pipe and enclosing an angle with such plane for confining particulate material traveled by the spreader pipe due to the whipping motion thereof within a zone at the discharge end of the spreader pipe which is vertically narrower than such discharge end.

2. Device as claimed in claim 1, characterized in that the guide surface on either side of the vertical longitudinal plane is formed by a flank of at least one inwardly protruding longitudinal rib.

3. Device as claimed in claim 2, characterized in that the pair of longitudinal ribs arranged symmetrically relative to the vertical longitudinal plane are located in a horizontal plane situated higher than the horizontal central longitudinal plane of the spreader pipe.

4. Device as claimed in claim 1, characterized in that the surface on either side of the vertical central longitudinal plane is formed by a bounding flank of a longitudinal groove.

5. Device as claimed in claim 1, characterized in that the surface is formed by a wall part of the spreader pipe which has a straight cross section.

6. A device as defined in claim 1 including baffle means adjacent the discharge end of the spreader pipe for intercepting and deflecting particulate material confined within the zone into a desired pattern of spreading onto the ground surface beyond the discharge end of the spreader pipe.

7. A device as defined in claim 6 wherein the zone is pierced by a generally horizontal plane containing the longitudinal axis of the spreader pipe.

8. A device as defined in claim 7 wherein the baffle means includes upper and lower brackets bounding the respective upper and lower boundaries of the zone.

9. A device as defined in claim 8 wherein the baffle means also includes a horizontal cross strip located.

10. A device as defined in claim 1 wherein the zone is pierced by a generally horizontal plane containing the longitudinal axis of the spreader pipe.

11. A device as defined in claim 10 wherein the zone lies largely above the generally horizontal plane.

12. A device for spreading particulate material over the surface of a field which comprises the combination of a frame adapted to be traveled over a field, a hopper carried by the frame for receiving particulate material and having a bottom discharge opening, a dosage mechanism receiving particulate material from the hopper from the bottom discharge opening and rotatably carried by the frame for oscillation relative thereto about a generally vertical axis, means for oscillating the dosage mechanism about its axis, the dosage mechanism including a spreader pipe extending substantially horizontally therefrom, the pipe having an open discharge end remote from the dosage mechanism and having a hollow interior, and guide means defining guide surfaces whose extensions intersect at an angle with a vertical central plane through the pipe for channeling particulate material through the interior of the pipe to the open discharge end thereof along zig-zag, horizontal paths confined within a horizontal zone located generally centrally of the pipe and of a lesser height than that of the cross-sectional area of the pipe.

13. A device for spreading particulate material such as fertilizer onto ground surface, which comprises the combination of a frame adapted to be attached to a powered vehicle and a hopper carried by the frame and having a bottom opening, a dosage mechanism disposed below the bottom opening of the hopper for receiving particulate material therefrom and including a horizontally projecting spreader pipe having a longitudinal axis, an infeed end communicating with the hopper bottom opening, an inner surface for guiding the particulate material along the length of the spreader pipe and a free end portion defining a discharge end, means for rapidly oscillating the dosage mechanism about a generally vertical axis so that the spreader pipe whips back and forth to impart velocity to the particulate material in a plane normal to the generally vertical axis while repeatedly striking the inner surface against such particulate material so as to impart movement of the particulate material along the length of the spreader pipe which tends to be helical relative thereto, and the inner surface of the spreader pipe including guide surface means on either side of a vertical plane containing the longitudinal axis of the spreader pipe and enclosing an angle with such plane for confining the travel of particulate material within the spreader pipe due to the whipping motion thereof within a zone of the spreader pipe which is vertically narrower than the cross-sectional area of the pipe.

14. A device as defined in claim 13 including upper and lower baffle means arching across the discharge end of the spreader pipe for intercepting and deflecting particulate material confined within the zone into a desired pattern of spreading onto the ground surface beyond the discharge end of the spreader pipe, and the pipe also having side discharge openings adjacent its discharge end for expelling particulate material against the baffle means.

* * * * *